Patented May 23, 1950

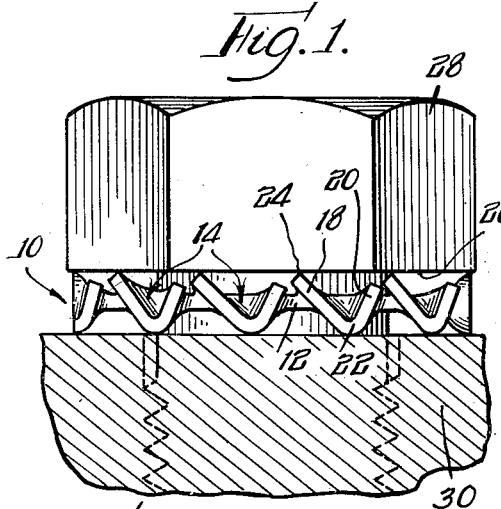
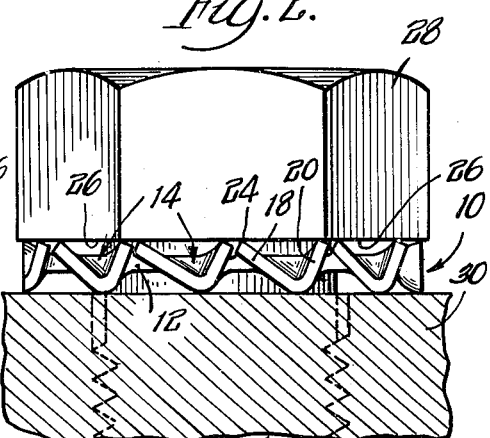
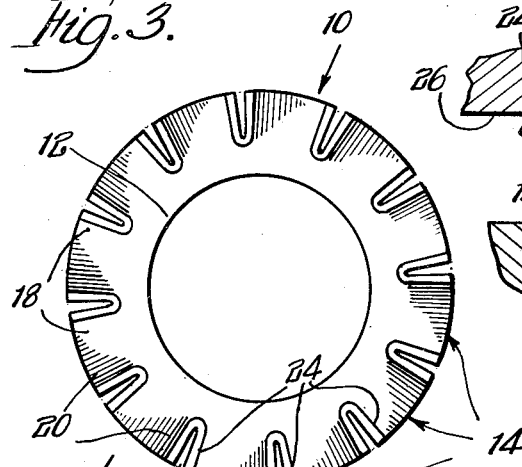
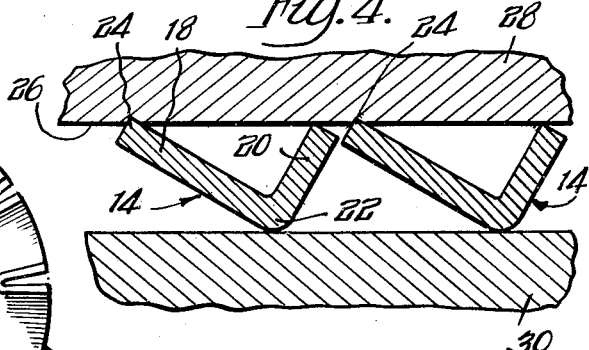
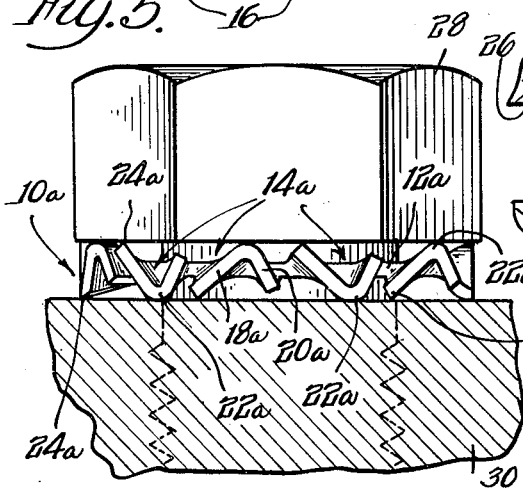
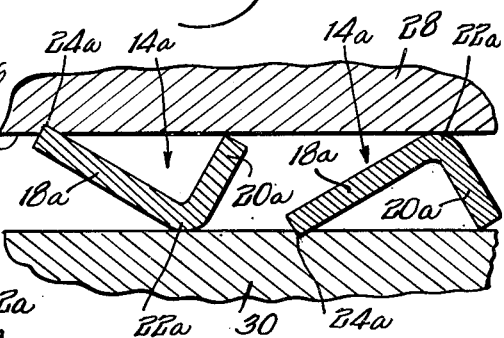

2,509,158

UNITED STATES PATENT OFFICE 2,509,158

LOCK WASHER

Frederick Long, Bramhall, England, assignor to Illinois Tool Works, Chicago, Ill., a corporation of Illinois Application May 17, 1946, Serial No. 670,484
In Great Britain June 14, 1945

4 Claims. (Cl. 151—35)

1

This invention relates generally to lock washers and more particularly to lock washers provided with work engaging portions or teeth of novel and practical construction.

It has heretofore been common practice to use lock washers equipped with relatively sharp locking teeth projecting beyond opposite sides of the plane of the washer body, the teeth on one side serving to embed themselves in the work surface and the teeth on the opposite side being adapted to lockingly engage the clamping surface of a rotary fastener, such as the clamping surface of a nut or screw head. In most instances on objection arises from the use of sharp lock washer teeth designed to impinge and, in fact, dig into the clamping surface of the rotary fastening element, but in many instances it has been found undesirable to deface or mar the work surface positioned on the opposite side of the lock washer. The present invention contemplates a lock washer having aggressive locking teeth extending from one side of the washer body, and rather blunt work engaging projections extending from the other side, these blunt projections beng such as to reduce to a minimum disfigurement or marring of the work surface. To accomplish this end it is proposed to produce a lock washer in which marginal sections of the stock are so configurated as to present relatively sharp teeth projecting from one side of the plane of the washer body and a series of rounded blunt portions positioned on the oppostde side of said plane.

More specifically, the invention contemplates a lock washer, as set forth above, capable of being stamped and formed from sheet metal stock, wherein marginal portions of the stock are bent into a series of sections of L-shaped form in circumferentail cross-section.

The invention further contemplates a l ock washer of improved practical design in which a series of marginal locking sections are provided, each section including both a locking tooth portion and a strut portion traversing the plane of the washer body for effectively resisting complete flattening of the locking sections.

More specifically, it is proposed to arrange the aforesaid locking sections along one margin of annular sheet metal stock, which sections are substantially L-shaped in circumferential cross-section, the longer arm providing at its outer extremity a tooth for aggressively engaging a clamping surface, and the shorter arm providing the aforementioned strut adapted to resist the relatively high clamping forces which are

2 experienced when the washer is tightened beneath a screw head or nut.

The foregoing and other objects and advantages will be more apparent from the following detailed description, when considered in connection with the accompanying drawing wherein:

Figure 1 is a side elevational view of a lock washer constituting an embodiment of the present invention, said lock washer being shown in side elevation about to be tightened beneath the clamping surface of a screw head;

Figure 2 is a view similar to Figure 1 showing the lock washer of Figure 1 tightneed in position beneath the screw head;

Figure 3 is a plan view of the lock washer shown in Figures 1 and 2;

Figure 4 is an enlarged semi-diagrammatic illustration of two teeth or locking sections of the washer to more clearly illustrate the manner in which the long portion of the L-shaped structure provides a locking tooth at its upper extremity, and the shorter portion provides an effective structure to resist flattening;

Figure 5 is a view similar to Figure 1, illustrating a modified form of washer wherein alternate teeth are oppositely positioned so as to present aggressive, as well as blunt, work engaging portions on opposite sides of the washer body; and Figure 6 is a view similar to Figure 4, illustrating the manner in which the locking sections of the washer shown in Figure 5 serve to lockingly engage the clamping surface of the screw head and work surface, and also serve to prevent complete flattening of the washer stock.

Referring now to the drawing more in detail wherein like numerals have been employed to designate similar parts throughout the various figures, it will be seen that one embodiment of my invention includes a lock washer designated generally by the numeral 10. This lock washer 10 consists of a body portion 12 having disposed along the outer margin thereof a plurality of locking sections 14.

These locking sections 14 are circumferentially separated by slits or recesses 16, and each locking section is of L-shaped form in circumferential cross-section. Each locking section 14 includes a portion 18 forming the long leg of the above mentioned L-shape, a portion 20 forming the short leg thereof, and a connecting portion 22 which integrally joins the portions 18 and 20, which leg portions diverge oppositely from a vertical plane through the connecting portion 22. The connecting portion 22 provides an arcuate, and hence relatively blunt, work engaging surface, as clearly illustrated in Figures 1, 2 and 4. At the free extremity of the portion 18 is an aggressive locking tooth 24 designed to actually bite into the clamping surface 26 of a screw head 28.

It will be seen from Figures 2 and 4 in which the washer 10 is tightened between the clamping surface 26 and the surface of a work piece 30, that as the screw head 28 is rotatably tightened against the sections 14, the teeth 24 are first engaged by the clamping surface 26, and the blunt connecting portions 22 are tightened against the surface of the work piece 30. Thus, as the screw head 28 is tightened against the washer from its initial position of engagement with the washer, as shown in Figure 1, to its final tightened position, as shown in Figure 2, the elongated leg portions 18 permit slipping of the clamping surface 26 along the teeth 24. As the tightening operation is continued, these teeth 24 ultimately embed themselves within the clamping surface, as illustrated at 24, and said surface is ultimately moved into contact with the free extremities of the shorter legs 20 of the L-shaped locking sections. It will be noted that these shorter leg or arm portions 20 are inclined to the clamping surfaces at a much greater angle than the legs 18, and as such provide struts for vigorously arresting any further tightening movement of the screw heads. In other words, the short portions of the L-shaped locking sections approach the vertical, as illustrated in Figures 1, 2 and 4, whereas the longer sections approach the horizontal. Thus the shorter portions 20 are much more resistant to clamping forces than the more resilient longer portions 18.

From the foregoing description it will be apparent that in the lock washer 10 all of the aggressive locking teeth are positioned on one side of the plane of the body portion, and the less aggressive and, in fact, blunt work engaging portions 22 are positioned at opposite sides of the washer body. This enables the washer to be used in instances where the work surface is such that no marring or disfigurement thereof may be tolerated. The relatively blunt portions 22 frictionally engage the work surface, whereas the clamping surface of the screw head or nut is aggressively engaged by the teeth 24. By having the elongated sections 18 of each locking section 14 disposed, as shown, the frictional resistance to clamping rotation of the screw head or nut is materially less than the resistance offered to retrograde rotation of the screw head. This facilitates tightening of the fastener against the washer, and the blunt work engaging portions 22 on the opposite side positively preclude any surface disfigurement.

In Figures 5 and 6 a slightly modified form of lock washer is shown, said lock washer being designated generally by the numeral 10A. A plurality of marginal locking sections 14A are provided along the outer periphery of the body portion 12A. Each locking section 14A, like the locking section 14 previously described, constitutes in circumferential cross-section an L-shaped form having an elongated leg portion 18A and a relatively short portion 20A connected by an arcuate portion 22A. The only structural difference between the lock washer 10 and the lock washer 10A is that alternate locking sections 14A of the lock washer 10A are oppositely positioned as shown in Figures 5 and 6. That is to say, in the lock washer 10A a plurality of locking teeth 24A, as well as a plurality of blunt surface engaging portions 22A are positioned on opposite sides of the central body portion 12A. In the washer 10, on the other hand, all of the locking sections 14 are similarly positioned so that the aggressive work engaging teeth 24 all lie on one side of the plane of the body and the relatively blunt work engaging portions 22 all lie on the opposite side of said plane. The lock washer 10A has the advantage of the strut portions 20A to effectively resist flattening of the washer stock and also permits either side of the washer to be applied to a clamping surface. In other words, both sides of the lock washer 10A are alike, and hence the user may apply either side of the washer, as in conventional lock washers.

From the foregoing it will be apparent that the present invention contemplates a lock washer of extremely simple, yet practical, construction capable of being stamped and formed from sheet metal stock. Each locking section, as above described, provides an aggressive work engaging tooth and a section to counteract complete flattening of the washer stock. The novel structural characteristics of the lock washer contemplated by the present invention provide increased locking efficiency, coupled with economy and ease of manufacture.

While the structural details disclosed herein are representative of certain embodiments of the invention, it will be apparent that the invention is capable of other modifications and changes without departing from the spirit and scope of the appended claims.

The invention is hereby claimed as follows:

1. A lock washer including an annular body, and a plurality of locking sections distributed along and extending radially with respect to a margin of said body, each section consisting of a radial member having its base joined integrally with the margin of the body, the free extremity of each of said members in circumferential cross section being L-shaped, the longer arm of each said member inclined with respect to and traversing the plane of the washer body with its outer end presenting a locking tooth normally positioned out of said plane, the shorter arm of each said member providing a relatively rigid substantially upright strut member having a work engaging tooth at its outer end normally positioned out of the plane of said annular body a distance less than the extent to which the first mentioned locking tooth is positioned out of said plane, the juncture of said arms presenting a relatively blunt work engaging surface disposed on the side of said plane opposite from said teeth and the said arms diverging oppositely from a vertical plane through the juncture thereof.

2. A lock washer including a body portion, and a plurality of radially extending locking sections positioned along and joined to a margin of said body portion, each of said sections in circumferential cross section presenting an integral relatively short portion traversing the plane of said body portion and also presenting an elongated portion inclined with respect to and traversing the plane of the body portion and having a work engaging tooth normally positioned further out of said plane than the end of said relatively short portion, said portions being connected so as to provide a relatively blunt work engaging surface disposed on the opposite side of said plane from said locking tooth, said shorter portion intersecting the plane of the washer body at an angle greater than the angle of intersection between the elongated portions and said plane and said elongated and short portions diverging oppositely from a vertical plane through said blunt work engaging surface.

3. A lock washer as set forth in claim 2, wherein some of the locking sections have their locking teeth positioned on one side of the plane of the washer body and other sections have their locking teeth positioned on the opposite side of said plane.

4. A lock washer as set forth in claim 2, wherein adjacent sections have the locking teeth thereof positioned on opposite sides of the plane of the washer body.

FREDERICK LONG.

REFERENCES CITED

The following references are of record in the file of this patent:

UNITED STATES PATENTS

| Number | Name | Date |
|---|---|---|
| Re. 19,479 | Olson | Feb. 26, 1935 |
| 1,715,777 | Olson | June 4, 1929 |
| 1,926,917 | Rosenberg | Sept. 12, 1933 |
| 2,322,776 | Poupitch | June 29, 1943 |

FOREIGN PATENTS

| Number | Country | Date |
|---|---|---|
| 651,999 | France | Oct. 16, 1928 |